United States Patent [19]

Stahl et al.

[11] Patent Number: 4,847,127

[45] Date of Patent: Jul. 11, 1989

[54] EDGE-REINFORCED HINGED GLASS WOOL INSULATION LAYERS

[75] Inventors: Julia A. Stahl, Granville; Richard F. Hayden, Mt. Vernon, both of Ohio

[73] Assignee: Owens-Corning Fiberglas Corporation, Toledo, Ohio

[21] Appl. No.: 198,702

[22] Filed: May 17, 1988

Related U.S. Application Data

[63] Continuation of Ser. No. 904,440, Sep. 8, 1986, abandoned, which is a continuation of Ser. No. 789,532, Oct. 21, 1985, abandoned.

[51] Int. Cl.[4] .............................................. B32B 3/00
[52] U.S. Cl. ...................................... 428/61; 428/57; 428/58; 428/121; 428/192; 428/194; 428/233; 428/248; 428/285; 428/920

[58] Field of Search ................... 428/61, 192, 194, 57, 428/58, 285, 121, 130, 211, 233, 248, 920

[56] References Cited

U.S. PATENT DOCUMENTS 3,582,421  6/1971  Arduser .............................. 156/192

Primary Examiner—Ellis P. Robinson
Assistant Examiner—P. R. Schwartz
Attorney, Agent, or Firm—Ted C. Gillespie

[57] ABSTRACT

A strip of reinforcing material is applied to an edge portion of a glass wool thermal insulation blanket. In a hinged, two-layer unit, the reinforcing strip is applied to a major surface of one of the layers on an edge portion opposite the hinge.

14 Claims, 1 Drawing Sheet

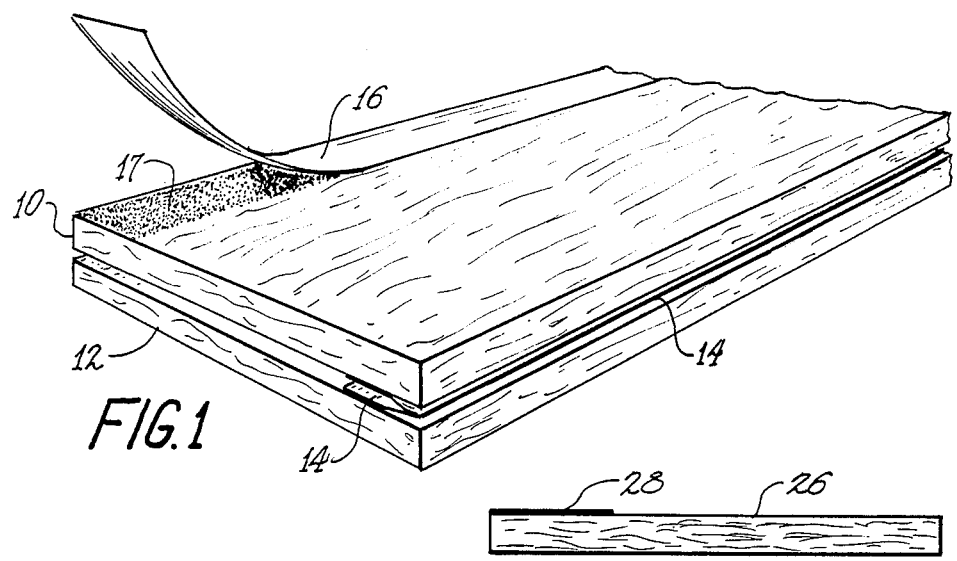
FIG.1
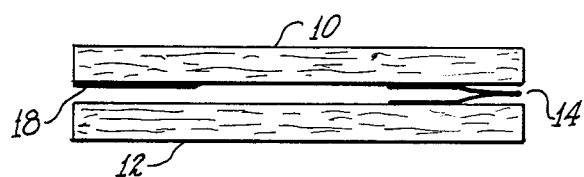
FIG.2
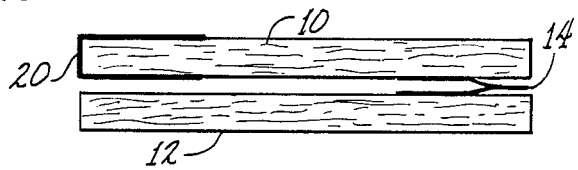
FIG.5
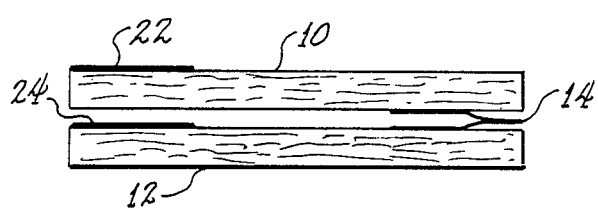
FIG.3
FIG.4

EDGE-REINFORCED HINGED GLASS WOOL INSULATION LAYERS

This is a continuation of application Ser. No. 904,440 filed on Sept. 8, 1986, now abandoned, which is a continuation of Ser. No. 789,532, filed on Oct. 21, 1985, now abandoned.

TECHNICAL FIELD

This invention relates generally to glass wool thermal insulation blankets, and more particularly to insulation blankets for insulating wide spaces. Such blankets may be manufactured and shipped as two layers hinged along one edge of each layer.

BACKGROUND ART

U.S. Pat. No. 4,006,079 shows single-layer glass wool material for use in soaking up oil spills. The material is reinforced across its full width with scrim.

DISCLOSURE OF INVENTION

In accordance with the invention, hinged glass wool insulation layers are provided with reinforcing material along an edge opposite the hinge on at least one surface of at least one layer.

BRIEF DESCRIPTION OF DRAWINGS

The invention is more fully explained hereinafter, reference being had to the accompanying drawings wherein:

FIG. 1 is a fragmentary perspective view of two layers of glass wool insulation hinged along one edge, one layer being reinforced along an edge opposite the hinge on an outer surface in accordance with the invention;

FIG. 2 is an end view of an alternative embodiment of the invention;

FIG. 3 is an end view of another alternative embodiment of the invention;

FIG. 4 is an end view of still another alternative embodiment of the invention; and FIG. 5 is an end view of yet another alternative embodiment of the invention.

BEST MODE OF CARRYING OUT THE INVENTION

With reference to the drawings, each of FIGS. 1-4 shows two layers 10 and 12 of glass wool insulation hinged together along one edge by a hinge 14 preferably made of kraft paper adhered to each of the layers.

In FIG. 1, a reinforcing strip 16, also preferably made of kraft paper, is adhered by adhesive 17 to an outer surface of the layer 10, i.e., the surface thereof facing away from the layer 12, along an edge portion thereof opposite the hinge 14.

In FIG. 2, a reinforcing strip 18 is adhered to an inner surface of the layer 10, i.e., the surface thereof facing toward the layer 12, along an edge portion thereof opposite the hinge 14. Unlike the embodiment illustrated in FIG. 1, the strip 18 is adhered to the same surface of layer 10 as at least one portion of the hinge 14.

In FIG. 3, a reinforcing strip 20 is wrapped over and adhered to an edge portion of the layer 10 opposite the hinge 14, covering the edge portion on inner and outer surfaces of the layer 10. Here again, as clearly shown in FIG. 3, one portion of the reinforcing strip 20 is applied to a surface of layer 10 to which a portion of the hinge 14 is also applied.

In FIG. 4, a reinforcing strip 22 is adhered to an outer surface of the layer 10 along an edge portion thereof opposite the hinge 14, and a reinforcing strip 24 is adhered to an inner surface of the layer 12 along an edge portion thereof opposite the hinge 14 but on the same surface as a portion of the hinge.

The strips 16, 18, 22, and 24 may be about six inches to twelve inches wide and may be made of materials other than kraft paper, such as kraft paper-aluminum foil laminate, kraft paper-scrim-aluminum foil laminate, spun-bonded polyethylene, or plain scrim.

While the invention is particularly advantageous for hinged, two-layer glass wool insulation, it is also applicable to single layers. FIG. 5 shows a single layer 26 of glass wool insulation having a reinforcing strip 28 adhered to an edge portion of one of its major surfaces.

Unrestrained glass wool insulation normally has a density of less than one pound per cubic foot and large pieces are subject to being torn apart when handled by their edge portions. This problem is especially acute when layers such as layers 10 and 12 are unfolded about the hinge 14 to provide a single layer twice as wide, for example, about twelve feet wide. As shown in the drawings, the glass wool is exposed at all surface areas of the blanket or layers of insulation except where covered by the reinforcing strip and the hinge material. The tearing problem is alleviated by the reinforcing strips.

Various modifications may be made in the structure shown and described without departing from the spirit and scope of the invention as set forth in the appended claims.

We claim:

1. A thermal insulation unit comprising two elongate layers of unfaced glass wool insulation hinged together for relative movement to folded and unfolded conditions by flat sheet material adhered to a pair of adjacent longitudinal edge portions respectively of major surfaces of said layers, each of said layers having a density of less than one pound per cubic foot and a width sufficient to render the layer subject to being torn apart when handled by a longitudinal edge portion thereof opposite from said flat sheet material transversely of the layer, and a strip of reinforcing material adhered to one of a pair of major surfaces of one of said layers along a free longitudinal edge portion thereof spaced transversely of the layer from said flat sheet material, the glass wool of said layers being exposed at all surface areas, when the layers of the unit are in the unfolded condition, except where covered by said flat sheet material and said strip reinforcing material, and the reinforcing material preventing said one layer from being torn apart when handled by the longitudinal edge portion thereof having said strip of reinforcing material thereon.

2. A thermal insulation unit as claimed in claim 1 wherein the flat sheet material is kraft paper.

3. A thermal insulation unit as claimed in claim 1 wherein the strip of reinforcing material is kraft paper.

4. A thermal insulation unit as claimed in claim 1 wherein said one major surface of said one layer is an outer surface facing away from the other of said layers when the layers of the unit are in the folded condition.

5. A thermal insulation unit as claimed in claim 1 wherein said one major surface of said one layer is an inner surface facing toward the other of said layers when the layers of the unit are in the folded condition.

6. A thermal insulation unit as claimed in claim 1 including a strip of reinforcing material adhered to the other major surface of said one layer along a free longitudinal edge portion thereof spaced transversely of the layer from said flat sheet material.

7. A thermal insulation unit as claimed in claim 1 including a strip of reinforcing material adhered to one of a pair of major surfaces of the other of said layers along a free longitudinal edge portion thereof spaced transversely of the layer from said flat sheet material.

8. A thermal insulation unit as claimed in claim where said one major surface of said other layer is an inner surface facing toward said one layer when the layers of the unit are in the folded condition.

9. In a thermal insulation unit comprising two elongate layers of unfaced glass wool insulation, each of which has a density of less than one pound per cubic foot, and hingedly joined together by flat sheet material adhered to a minor portion of said layers along a longitudinal edge of a major surface of each layer to form a hinge therebetween, the improvement comprising a strip of reinforcing material adhered to at least one of the major surface longitudinal edges of either layer opposite the edges associated with the hinge to substantially reduce the tendency of the layer having the reinforcing strip from otherwise being torn apart when handled by that edge.

10. The insulation unit of claim 9 wherein each layer has a strip of reinforcing material adhered to a major surface longitudinal edge.

11. The insulation unit of claim 9 wherein the reinforcing strip wraps around the longitudinal edge so that the strip is adhered to both major surfaces of the layer.

12. The insulation unit of claim 9 wherein the reinforcing strip is adhered to a major surface also having a portion of the hinge adhered thereto.

13. A thermal insulation unit comprising:
   first and second elongate layers of glass wool insulation, such layers having a density of about less than one pound per cubic foot;
   flat sheet material adhered to a minor portion of a major surface longitudinal edge of the first and second layers to form a hinge therebetween;
   a strip of reinforcing material adhered to a minor portion of a major surface longitudinal edge of the first layer opposite edge region associated with the hinge, the surfaces of the first and second layers being exposed glass wool except for the minor portions of the surfaces joined to the flat sheet material and the reinforcement strip, the reinforcement strip being effective to substantially reduce the tendency of the first layer to be otherwise torn apart when handled by that edge.

14. The insulation unit of claim 13 wherein a reinforcement strip is adhered to a minor portion of a major surface lateral edge opposite said hinge.

* * * * *